Oct. 8, 1946.  F. J. RODE  2,408,883
SOLENOID CONTROLLED VALVE
Filed Oct. 1, 1942  4 Sheets-Sheet 2

INVENTOR.
FREDRICH J. RODE
BY Fay, Macklin, Grolich
Williams, Chilton and Isler
ATTORNEYS.

INVENTOR.
FREDRICH J. RODE

Patented Oct. 8, 1946

2,408,883

UNITED STATES PATENT OFFICE 2,408,883

SOLENOID CONTROLLED VALVE

Fredrich J. Rode, Toledo, Ohio, assignor to E. W. Bliss Company, Brooklyn, N. Y., a corporation of Delaware Application October 1, 1942, Serial No. 460,427

2 Claims. (Cl. 277—21)

This invention is directed to improvements in solenoid operated valve mechanisms and the general object thereof is to provide an improved arrangement of the elements of valve apparatuses which are utilizable particularly in the machine tool art for controlling fluid pressure lines associated with various fluid operated mechanisms.

Difficulties have been experienced heretofore in the obtaining of a suitable solenoid valve mechanism which will be dependable throughout protracted periods of use of the machine tool of which the valve mechanism comprises a part. One instance is the pneumatic operation of heavy duty clutches incorporated in large metal working presses. The operating pressures required in such an environment are such that in many instances, the usual type of solenoid operated valve does not function with sufficient exactitude or promptness to further the best obtainable performance of the machine tool. In some instances a main pneumatically operated valve controlled by an auxiliary solenoid operated valve has been used.

Various other auxiliary features have been added to the usual valve mechanism to obtain the desired machine performance, which, while proving satisfactory, nevertheless have complicated the manufacture and the maintenance of an otherwise simple solenoid and simple valve mechanism.

It is the object of the present invention to simplify the construction of solenoid operated valves used in the above mentioned arts and to reduce to as few parts as possible all intermediate mechanisms between the solenoid and the valve controlling the pressure line.

A further purpose is to provide a duplex valve structure wherein the valve closing members, while arranged to be operated simultaneously or in unison by a single solenoid mechanism, are relatively free to shift into a seating or valve closing position. This arrangement has the advantage that it makes it easier to machine and assemble the valve mechanism since freely adjustable valve members do not require the same amount of precision in both instances as is required by the rigid members used heretofore.

A still further object of the present invention is the provision of a valve mechanism of the character referred to, and comprising vertically aligned valve parts which are alternately closed and opened by a solenoid mechanism acting upon spherically shaped metallic valve closing members which are free to move under the influence of gravity when the solenoid mechanism is not energized.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various structural froms in which the principle of the invention may be used.

Figure 1:
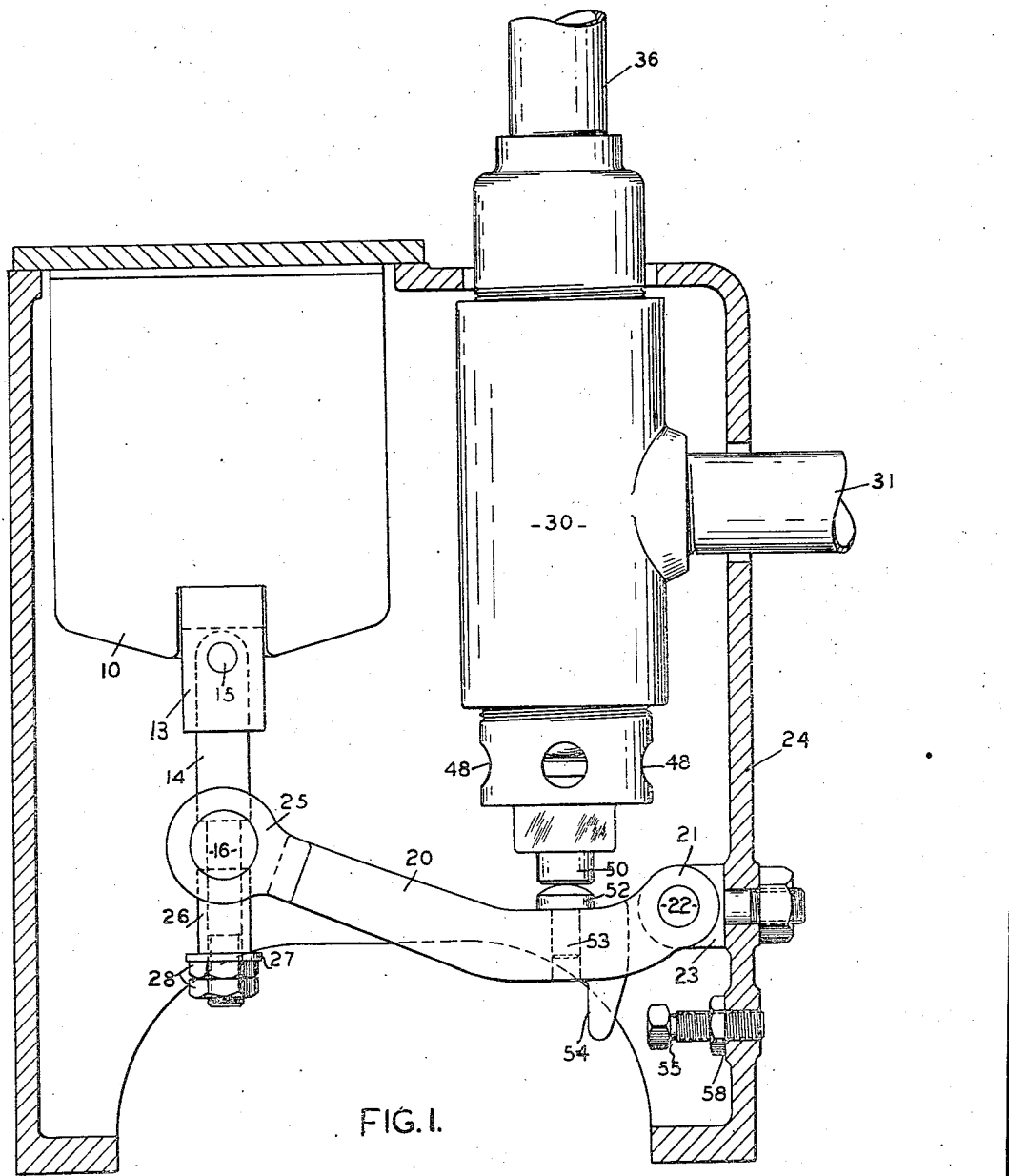
Fig. 1 is a front elevation of the solenoid case and the valve housing.
Figure 2:
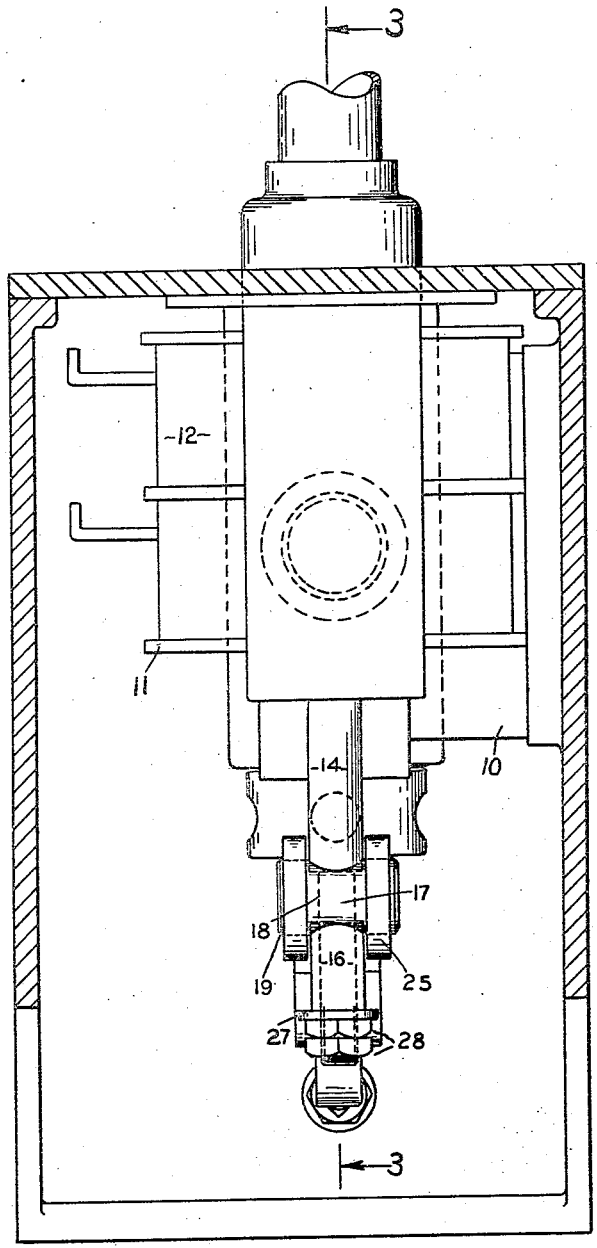
Fig. 2 is a side elevation of the same.

Referring to Figs. 1 and 2, the mechanism is shown to comprise a case 10 enclosing a solenoid 11 having a coil 12. 13 designates a part of the armature to which a rod 14 is connected by a pin 15. Rod 14 has a reduced lower portion 16 which is received in a bore 18 of a pin 17. The upper portion of said bore 18 is wider so as to accommodate rod 14 therein. Pin 17 is moreover shaped with two flanged ends 19 which serve for supporting two loop shaped ends 25 of a lever 20 which are journalled thereon. Lever 20 is with its other end 21 journalled on a shaft 22 mounted in a boss 23 of the casing 24 which encloses the entire valve mechanism.

For enclosing the bottom portion of rod 16 and holding the parts assembled a sleeve 26 is provided, which is of the same diameter as rod portion 16. A washer 27 and a double locking nut 28 screwed to the threaded bottom part of rod portion 16 serve for fastening sleeve 26 to the rod.

The valve comprises a cylindrical casing 30 which has a threaded branch 29 for direct connection by an air pipe 31 to the clutch (not shown) or other pneumatically operated mechanism to be actuated by said valve mechanism. On the top of cylinder 30 a valve chamber 32 is formed by a cylindrical head 33 screwed to valve body 30 as at 35. Chamber 32 has a threaded branch 34 which connects a pipe 36 leading to a factory air line. Mounted between the end of head 33 and a shoulder 37 formed on body 30 is a ring shaped valve seat 39 adapted to receive a ball valve 38 which abuts but is not fastened to the uper end of a shaft 40. Ribs 43 on the inside wall of head 33 serve as guide means for the ball valve. The shaft 40 is slidingly received in bushings 41 mounted in a cylinder 42 suitably supported within the body 30 to form air passages therebetween. Shaft 40 abuts a second ball valve 44 at its lower end, which valve is accommodated in a valve chamber 45 similar to the first mentioned chamber 32. The valve seat 46 corresponds to seat 39, the enclosing cylinder 47 to head piece 33. The bottom clinder is, however, provided with four openings 48 equally spaced around the circumference, and the bottom end of cylinder 47 has a central bore for receiving a plunger 50 with a head plate 51. The latter abuts ball valve 44 which is shown in the open position. Plunger 50 is in direct contact with a button 52 fastened to lever 20 by a pin 53. A finger 54 formed on said lever is adapted to bear on a stop screw fastened to casing 24 at 55, thus limiting the rocking movement of lever 20 around pin 22.

The valve according to the invention is designed to apply or interrupt pneumatic pressure to a clutch mechanism or other pneumatically controlled mechanism; the solenoid is intended to operate the valve for the above indicated action. Electrical energy to the solenoid coil may be controlled either manually or automatically as desired by known means, which do not form a part of the present invention and have, therefore, not been shown in the drawings.

The device operates as follows: When it is intended to apply the clutch mechanism, air from the pressure line of the plant has to be admitted from line 36 by unseating valve 38 and at the same time pushing valve 44 onto its seat 46 allowing air to flow from the valve body 30 through line 31 leading to the clutch. To bring about the indicated movement of valves 44 and 38, pressure has to be applied to plunger 50 by button 52. This is done by energizing solenoid 12, causing the armature 13 and rod 15 to be lifted, which in turn makes lever 20 rock in upward direction and push button 52 against plunger 50.

If the clutch has to be disengaged the opposite sequence of movements is performed. The solenoid is de-energized and, in consequence thereof, the armature is released from within the coil and takes up the position shown in Fig. 1. Rod 14, 16, moves downward, pushing lever 20 down as well, button 52 moves away from plunger 50 until finger 54 abuts on stop 55. If plunger 50 no longer presses its head against ball 44, the latter will drop under the influence of its weight down to the position shown in Fig. 3, while at the same time ball 38 is seated. Air may then be withdrawn from the clutch through line 31, chamber 45 and the exhaust holes 48.

Figure 4:
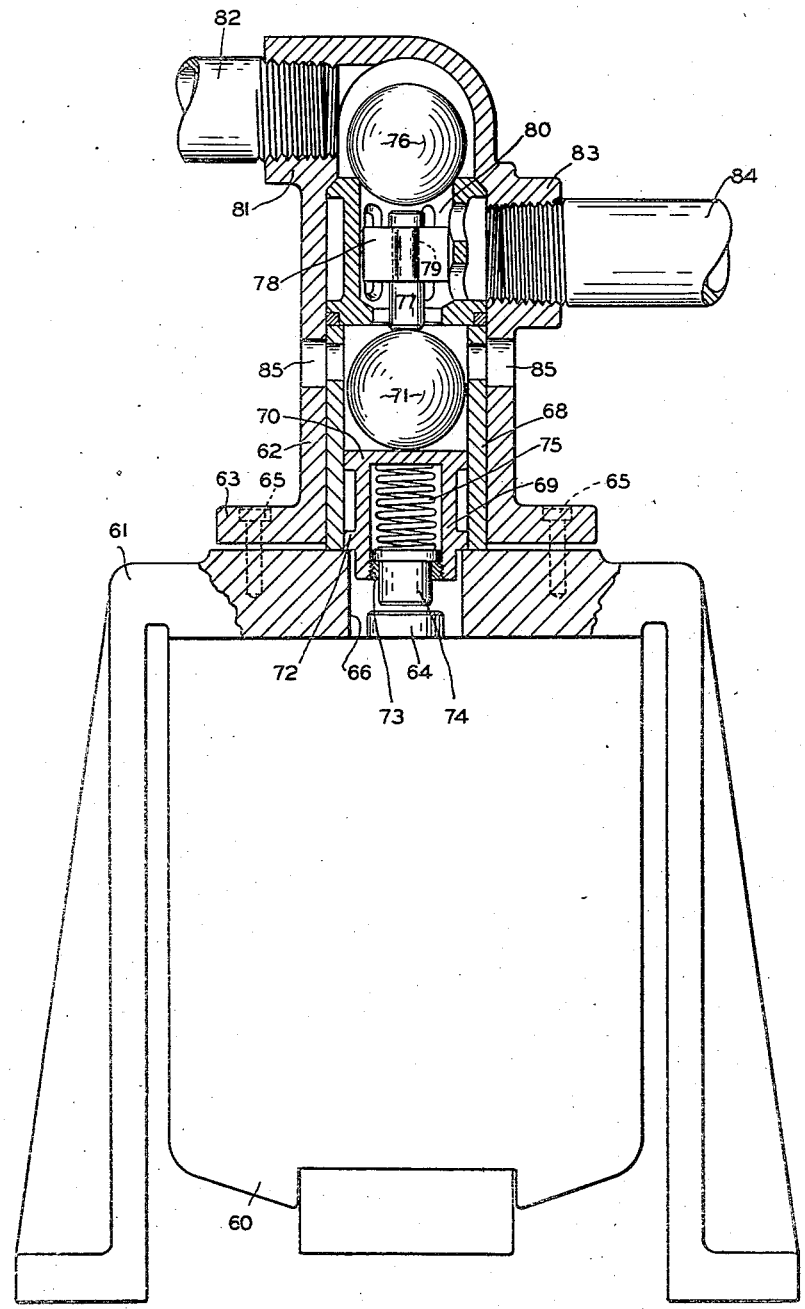
Fig. 4 is a view, partly in section, of a modification of the valve control mechanism.

Fig. 4 shows a somewhat modified construction of the valve mechanism and the control therefor. In this embodiment of the invention the case enclosing the solenoid is designated by 60. It is supported by a frame 61 to which the valve body 62 is secured with a flanged portion 63 by screws 65. A rod 64 is in direct connection with the armature (not shown) and protrudes into a circular opening 66 of frame 61.

Accommodated within the vertical portion of the valve body 62 adjoining frame 61 is a sleeve 68 which slidably receives a member 69 that acts as a connection between rod 64 and the valve members. Member 69 has a flanged top 70 directly bearing on the lower spherical valve member 71 and another flange 72 which in the down position shown in the drawings, bears on the edge of the frame 61 and acts as a stop in the downward movement of the valve. The lower end of member 69 is threaded on the inside to receive a threaded bushing 73; into this bushing a short plunger 74 is fitted that has one end of a spring 75 fastened thereto while the other end of the spring abuts on top 70 of member 69. The spring acts as a cushion in the movement of valve member 71.

The connection between the two valve members 71 and 76 is made by a rod 77, the lower end of which rests on ball 71 in the down position of the valve, while the upper end contacts valve member 76 when the valve is lifted into up position by the actuation of rod 64. A cross-shaped member 78, mounted on a reduced portion 79 of rod 77 serves for guiding the same in its vertical movement in a chamber 80, while providing channels for the air to pass through. The wall of chamber 80 at its upper end forms a valve seat for ball 76. A threaded branch 81 of valve body 62 connects a pipe 82 leading to the factory air line, while another threaded branch 83 of the valve body connects chamber 80 over pipe 84 to the pneumatically operated clutch or the like. Exhaust holes 85 are provided for withdrawing air in case the clutch or other pneumatically operated mechanism is to be disconnected.

Figure 3:
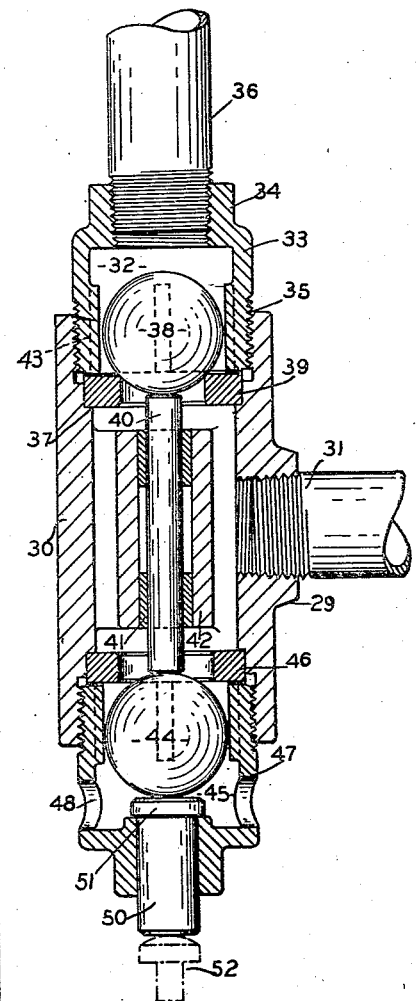
Fig. 3 is a section through the valve body.

The operation of this mechanism is similar to the one illustrated in Figs. 1 to 3. When the clutch is to be applied air is admitted through pressure line 82 to line 84 leading to the clutch. To bring this about valve 71 is lifted from the down position into the up position, thereby unseating ball valve 76. To lift valve 71 the solenoid is energized, the armature moved in upward direction, taking rod 64 along, which thereby lifts plunger 74 and connecting member 69 for the desired actuation of said ball.

For disconnecting the clutch the solenoid is deenergized and the above described movement of the valve members reversed thereby. As soon as rod 64 returns to the position shown in Fig. 4 and member 69 is free to descend ball 76 will be seated, thereby shutting off the supply of air from the pressure line, while ball 71 will be unseated to open the connection between line 84 and the exhaust holes. This returning of the valves to starting position occurs under the influence of gravity, with spring 75 acting as a shock absorbing means.

Figure 5:
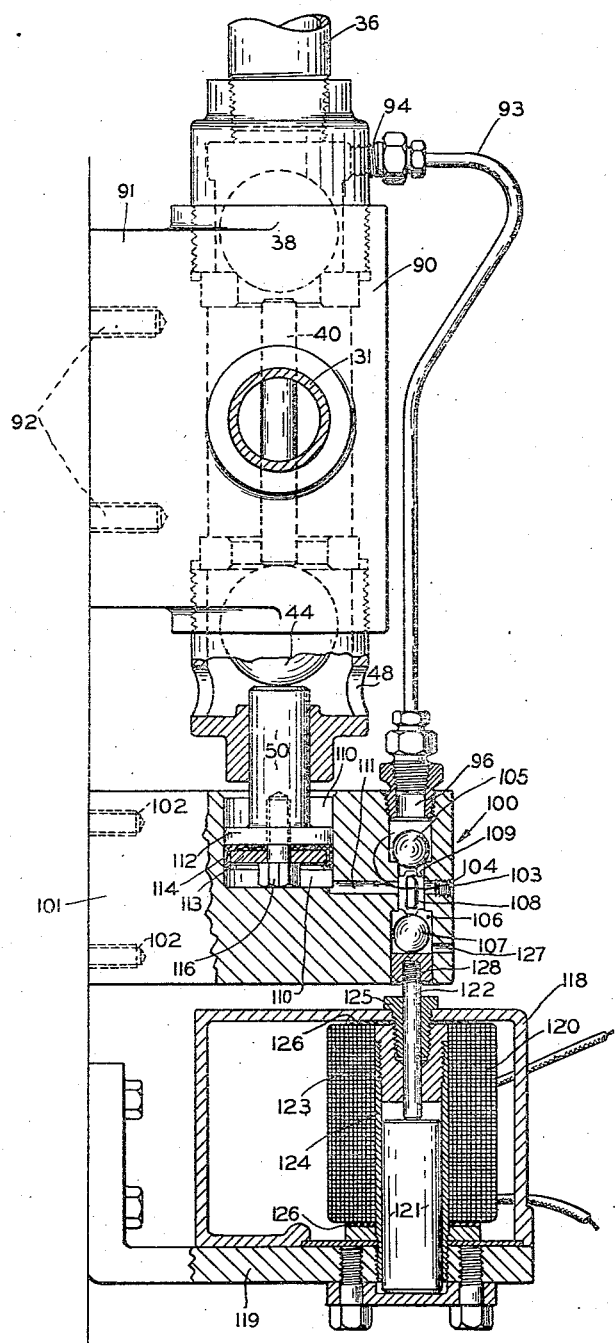
Fig. 5 is, partly in section and partly in elevation, a view of yet another modified construction of the valve control mechanism.

In Fig. 5 a further modification is shown in which a pilot valve is arranged between the solenoid and the main valve, both valves being of similar construction.

The main valve is enclosed in a casing 90 which has a square portion 91 for attachment to a desired frame, as at 92. The valve enclosed in casing 90 is almost identical with the one described with reference to Figs. 1 to 3; there is only the difference in the connection between the two balls 38 and 44 by rod 40 being interrupted in case the valve is in down position for release which will be more fully explained below.

From line 36 a by-pass line 93 is branched off at 94 which connects to a port 96 of the pilot valve, generally designated by 100. The pilot valve is housed in a casing 101 interposed between the solenoid and the main valve and attached to the machine frame at 102. The valve comprises an upper valve chamber 104 which receives a ball valve 105 and a lower chamber 106 which encloses a ball valve 107. For connecting the two balls a member 108 is provided which is similar to the rod 77 with the cross-shaped arms 78, shown in Fig. 4 of the drawings. This member 108 is slidable within a bore 109 connecting the two valve chambers. A passage 111 leads from bore 109 to a cylinder 110 formed in casing 101, which cylinder is adapted to receive a piston head mounted on plunger 50. Passage 111 is normally closed at the free end 103, while an exhaust opening 127 connects the lower valve chamber 106 with the atmosphere.

The piston head on plunger 50 comprises a plate 112 integrally formed with said plunger and a metal plate 113 with a packing 114 interposed between the two plates; the parts are fastened together by a bolt 116.

The diameter of the piston head has to be larger than that of the ball valve seats and must be so chosen with respect to the latter that the pressure exerted on the surface of the head will suffice to lift ball valve 44 and rod 40 and to overcome friction. Owing to the fact that rod 40 does not contact ball 38 but has to traverse a certain space before arriving there, a momentum will be gathered which will allow the unseating of ball 38. The exact ratio of the dimensions in question may be easily found by computation.

The solenoid is of known construction and comprises a casing 118 on a supporting casting 119. The coil is designated by 120, the armature by 121. A rod 122, whose bottom end is in direct contact with the armature, is slidably received in a plug 123 screwed into a metal sleeve 124 which encloses the armature 121. Screwed into the upper portion of plug 123 is another plug 125 which holds the upper part of rod 122 and by a flanged end caps the opening at the top of casing 118. The solenoid coil 120 is insulated from the casing by disks 126 of rubber or other insulating material.

The top end of rod 122 is screwed into a sliding member 128 which abuts ball valve 107 and serves for moving the same to up position.

The operation of the valve mechanism is the following: If a clutch or other pneumatically operated mechanism is to be actuated the solenoid is energized and the armature lifted thereby. At the same time rod 122 is pushed upward and ball 107, by pressing member 108 against valve ball 104, effects unseating of the latter. This allows air to flow from pressure line 93 over passage 111 into cylinder 110 and to push the piston head on plunger 50 to lift ball valve 44. The clutch will then become operative as described with respect to the valve mechanism shown in Figs. 1 to 3.

For declutching the solenoid is deenergized; thereby the armature is released to take up the position shown in Fig. 5, the controlled members 122, 128, 107 and 109, all taking a down position as well. Air pressure is thus shut off from line 111 and cylinder 110, so that plunger 50 will return to the down position actuated by gravity and will cause the shutting off of air pressure on the clutch and open the passage to the exhaust holes. The cycle of operations is completed thereby.

It will be understood from the foregoing description that with a simple and light construction of parts owing to the novel features of my invention comprising the arrangement of dual valve mechanism with independently alignable spherically shaped valves, a solenoid controlled valve mechanism has been devised which functions with desired precision and promptness and is, therefore, most dependable and satisfactory in its results.

Another advantage of the novel device is the greater safety for the operator when handling the mechanism in the control of a machine tool.

By the vertical arrangement of the intake and exhaust valve parts with spherical valve members simultaneously operable as shown, a distinct safety factor is inherent, in that should the intake valve member fail to close direct connection of the compressed air source to the exhaust port takes place. This feature would, for example, prevent the operation of a machine tool should the intake valve member not close at the desired time.

No springs are associated with the valve members, the latter being operated in one direction by solenoid actuation and in the opposite direction by gravity and air pressure, thus effecting the elimination of spring actuated valve members and attendant operating difficulties. Should there be failure in the operation of the solenoid itself for any reason, the prompt closing of the intake valve part is assured, since its closing movement is not dependent upon the solenoid.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A valve mechanism adaptable for actuation by a solenoid mechanism comprising a valve casing; a pair of interconnected valve members in said casing independently alignable and operated by mechanical pressure in one direction and by their own weight in the opposite direction; means loosely interposed between said valve members for transmitting force from one of said valve members to the other valve member; a plunger reciprocable in said casing independently of said valve members and receiving the weight of at least one of said valve members, said plunger having an end adapted to be engaged by a moving member, such as a solenoid armature, for movement in one direction for actuating the valve members; and means associated with said valve casing for limiting movement of the plunger in the opposite direction for causing disconnection of said plunger and moving member and for positioning one of said valve members in one of its valve controlling positions.

2. A valve mechanism adaptable for actuation by a solenoid mechanism comprising a valve casing; a pair of interconnected valve members in said casing independently alignable and operated by mechanical pressure in one direction and by their own weight in the opposite direction; means loosely interposed between said valve members for transmitting force from one of said valve members to the other valve member; a plunger reciprocable in said casing independently of said valve members and receiving the weight of at least one of said valve members, said plunger having associated therewith a member extending from one end thereof and a yieldable element interposed between the last mentioned member and the plunger, said extending member being engageable by a moving member, such as the armature of a solenoid, for causing the plunger to move in one direction for actuating the valve members; and means associated with said valve casing for limiting movement of the plunger in the opposite direction for causing disconnection of said extending member and moving member and for positioning one of said valve members in one of its valve controlling positions.

FREDRICH J. RODE.